Oct. 2, 1962

G. H. WESTMAN 3,056,419

LIQUID PURIFICATION APPARATUS

Filed May 19, 1960

INVENTOR
GEORGE H. WESTMAN
BY
John E. Stryker
ATTORNEY

United States Patent Office 3,056,419
Patented Oct. 2, 1962

3,056,419
LIQUID PURIFICATION APPARATUS
George H. Westman, 14 Swallow Lane, St. Paul, Minn.
Filed May 19, 1960, Ser. No. 30,287
9 Claims. (Cl. 137—209)

This invention relates to liquid purification apparatus for automatically adding a required quantity of purifying liquid or other treatment agent to a proportional quantity of water as it is drawn from a source of supply. The invention is particularly adapted for use in purifying water drawn from a contaminated source of supply, such as a well, cistern or natural body of water. Such water systems usually employ an intermittently operating, power-driven pump having an intake connected to the source of supply and an outlet connected to a reservoir such as a pressure tank from which the treated water is drawn. Many such systems in present use have electric motor-driven pumps and pressure responsive electric controls for the pump motors whereby the pumps are operated intermittently for periods of time sufficient to raise the pressure from a predetermined low or starting pressure to a predetermined high or stopping pressure in the reservoir tank. Thus in these conventional (usually domestic) water systems a predetermined quantity of water is supplied to the reservoir tank during each pump cycle.

The best known purifying agent to make contaminated water potable is a chlorine solution in a concentration within the range of two parts to six parts of 2% solution per million parts of water. The present invention is particularly, although not exclusively, adapted to provide chlorination treatment of this character.

It is an object of my invention to provide for water systems of the type described simple automatic apparatus for adding an accurately measured quantity of a purifying liquid to the water supplied during each cycle of pump operation.

A particular object is to provide for a water system of the class described chlorinating apparatus which comprises a treatment liquid container having an expansion chamber of predetermined capacity and a conduit of predetermined smaller capacity extending from the treatment liquid container to the water supply system.

The invention also includes certain other novel features and details of construction which will be more fully pointed out in the following specification and claims.

Figure 1:
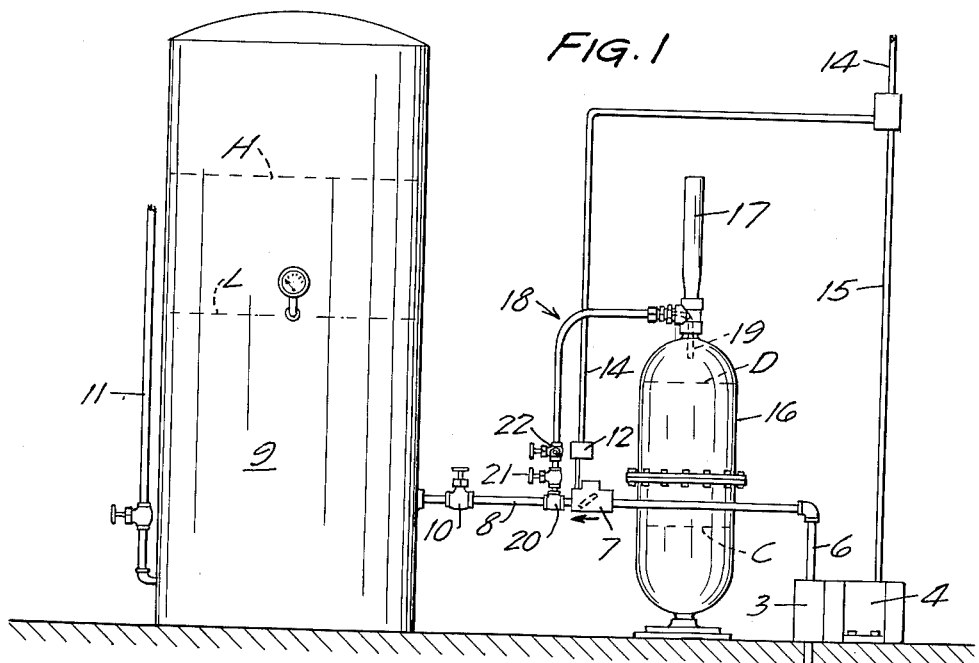
Figure 2:
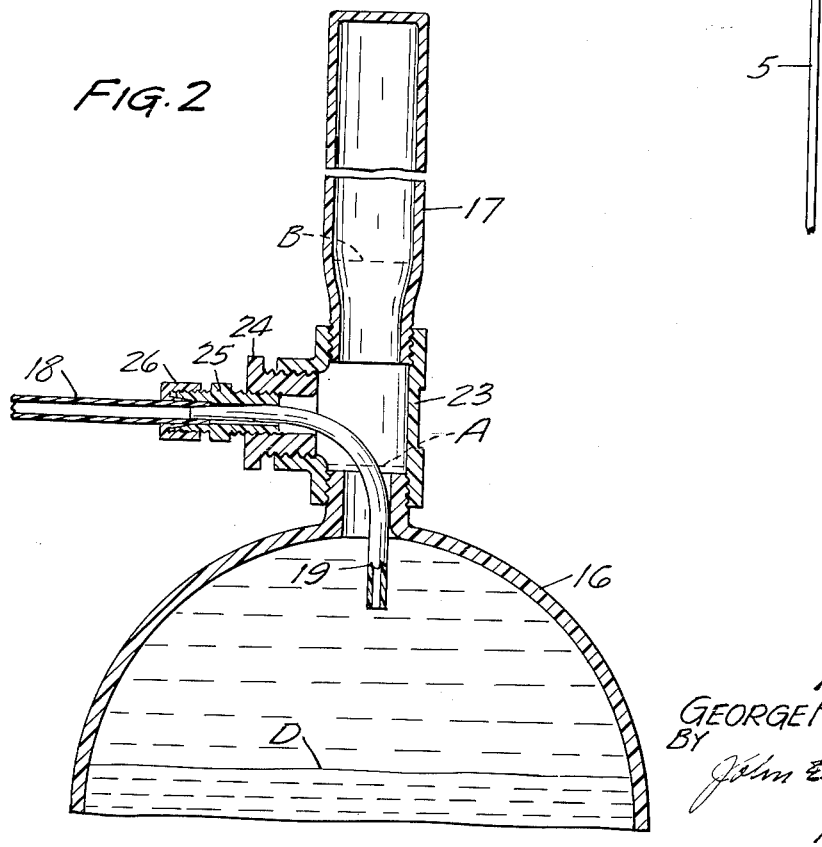

Referring to the accompanying drawings which illustrate, by way of example and not for the purpose of limitation, a preferred embodiment of my invention:

FIGURE 1 is a side elevational, somewhat schematic view showing my improved treatment apparatus in connection with a water supply system of common type, and FIG. 2 is a fragmentary vertical sectional view, on a larger scale, showing an upper portion of the treatment liquid container, its expansion chamber, and a terminal portion of the conduit for supplying treatment liquid to the water system.

As shown in FIG. 1, a conventional type of water system has a pump 3 operatively connected to an electric motor 4 and adapted to receive water from a source of supply through an intake pipe 5. The pipe 5 may receive water from a well, cistern or natural body of water. A pump discharge pipe 6 extends to a check valve 7 and the outlet side of this valve is connected by a tank supply pipe 8 to a reservoir comprising a pressure tank 9. A manual valve 10 is usually provided in the supply pipe 8 and a service pipe 11 constituting the tank outlet is connected to the lower portion thereof. Many conventional water supply systems are provided with a pressure responsive control for the motor 4 which, as illustrated, comprises a pressure responsive electric switch 12 having a tubular connection 13 with the supply pipe 8. Switch 12 controls a power circuit including power supply conductors 14 and conductors in a conduit 15 extending to the motor 4.

My improved treatment apparatus comprises a treatment liquid container 16 having an expansion chamber 17 at the top thereof and a conduit, indicated generally at 18, connecting the upper portion of the container 16 to the supply pipe 8. Conduit 18 includes suitable fittings connecting it to the container 16, a tubular end portion 19 communicating with the upper portion of the container 16, a T fitting 20 conecting it to the tank supply pipe 8, a manual valve 21 adjacent to the fitting 20 and a drain cock 22.

As best shown in FIG. 2, the upper portion of the container 16 is formed with a threaded neck to which is connected a T fitting 23. The upper branch of the fitting 23 has a threaded connection with the lower end of the expansion chamber 17 so that the latter is readily removable for the replenishment of the treatment agent in the container 16. A third branch of the T 23 is connected to the conduit 18 by fittings of conventional type indicated at 24, 25 and 26. The fittings 25 and 26 provide a sealed connection between the upper end of the tubular extension 19 and conduit 18. The lower end of the extension 19 is open and is normally submerged in the treatment liquid.

It is essential to the operation of the present invention that the volume of liquid which is forced out of the expansion chamber 17 into the container 16 and thence into the conduit 18 during each pump cycle shall be greater than the capacity of the conduit 18 including that of the tubular extension 19, fittings and valves 21 and 22. For convenience of reference, the volume of the expansion chamber discharge during each cycle may be called the "cycle discharge volume" which is determined by the volume of air contained in the expansion chamber at atmospheric pressure and the volume of liquid discharged from the chamber as a result of the drop in pressure to which the air in the chamber is subjected between pump cycles. The excess of the cycle discharge volume over the capacity of the conduit 18 is a measure of the treatment liquid which is discharged into the water system following each pump cycle.

Operation

Pressure responsive switch 12 is operative to start the pump motor 4 when the pressure in the tank 9 reaches a predetermined low, for example, 25 pounds per square inch and the pump is operated until the pressure in the tank has been raised to a predetermined upper limit, e.g., 50 pounds per square inch, at which time the switch 12 operates to deenergize the motor 4 and stop the pump. During this cycle of operation the level of the water in the tank 9 is raised from the low level L to the high level H shown in FIG. 1, with the result that a predetermined volume, for example fifteen gallons, is fed to a tank 9 of 82 gallon capacity during each pump cycle. Thereafter the pump remains inoperative until the quantity of water fed to the tank during the preceding cycle has been withdrawn therefrom through the service pipe 11, thereby reducing the pressure in the tank to the predetermined low point at which the pump cycle is repeated.

When in operation, the container 16 is filled with the treatment solution and solid agent from which the solution is formed by addition of water. The solution or other treatment liquid is forced up into the expansion chamber 17 where it compresses air contained in the upper portion of the chamber to various volumes, depending on pressure changes. The low liquid level is indicated at A and the high level at B in FIG. 2. During each pump operating cycle the pressure gradually rises in the tank 9, water supply connections and conduit 18, while water is fed through the conduit 18 into container 16 in sufficient quantity to cause the level of liquid in expansion chamber 17 to rise from a predetermined low level A to a predetermined high level B, at which time the pump is stopped. Thereafter, as water is withdrawn through the service pipe 11 the level of water in the tank 9 and treatment liquid in chamber 17 recedes, while a predetermined small quantity of treatment liquid flows from the container 16 into the conduit 18 through the tubular portion 19 thereof.

As hereinbefore pointed out, the quantity of treatment liquid which reaches the pipe 8 and tank 9 is equal to the excess of the flow from the container 16 into the tubular extension 19, during each cycle, over the capacity of the conduit 18 which is equal to the volume of liquid contained in conduit 18 including that contained in the tubular extension 19, fittings and passages through valve 21 and drain cock 22.

In one embodiment of the invention the pressure range in the water system was from 25 to 50 pounds per square inch and the expansion chamber 17 had a total capacity equal to 15¼ fluid ounces. The cycle discharge volume of this chamber, viz., the volume represented by the drop in level from the high to the low level as a result of the pressure drop, was 2½ ounces. In this embodiment, the capacity of the conduit 18 was 2 fluid ounces, with the result that one-half of a fluid ounce of liquid was forced into the pipe 8 through the fitting 20 following each cycle of pump operation. In this same system having an 82 gallon tank, 15 gallons of water was pumped into the tank 9 during each cycle with the result that 3 parts of treatment solution (2% chlorine) was supplied per million parts of water automatically.

For chlorinating water supplies, the container 16 may be charged with granular or pelletized chemical compound which will react with water to produce a chlorine solution. For example, calcium hypochlorite ($Ca(OCl)_2$) which provides 70% of available chlorine may be used. Such granular material may be charged into the container 16 to a height such as that indicated at C in FIG. 1. When water is added a chlorine solution fills the upper portion of the container and, due to specific gravity variations, is stratified with the saturated 10% solution below an elevation D (FIGS. 1 and 2) and various lower concentrations or potencies above elevation D. It will thus be evident that solutions of selected potencies may be withdrawn through the tubular extension 19, depending on the depth to which the lower end of this tube extends in the container 16.

In the example hereinbefore described, a tube extension 19 six inches long was used and a 2% solution was delivered. Tests showed that by increasing the length of this tube to 7 inches a 4% chlorine solution could be obtained thereby doubling the concentration or parts per million of water that could be obtained from apparatus otherwise the same.

In another example wherein the tank 9 had a capacity of 42 gallons and wherein the pressure differential range was from 25 to 50 pounds per square inch, it was found that seven gallons of water was pumped into the tank during each pump cycle. It was found that a dosage equal to 3 parts per million could be attained merely by shortening the tubular extension 19 to four and one-half inches, without other change in the test apparatus. It is thus feasible to adjust the apparatus for water systems having tanks of widely varying capacities merely by extending the lower end of the tubular extension 19 to a suitable depth in the stratified chlorine solution.

The size of the container 16 may be varied between wide limits but it has been found that a container 16 of approximately 4½ gallon capacity will provide the average domestic water system with adequate chlorination for a period of many months without recharging. When recharging becomes necessary, the valve 21 may be closed and the drain cock 22 opened to drain off the liquid contained in the conduit 18 and expansion chamber 17. Upon the restoration of atmospheric pressure in the expansion chamber and container 16, the liquid level in the latter will drop to a point below the lower end of the tubular extension 19. Expansion chamber 17 may then be detached from the fitting 23 and a new charge of granular material may be fed into the container 16 through the upper branch of the fitting 23. To return the chlorinator to service, expansion chamber 17 is replaced, drain cock 22 is closed and valve 21 is slowly opened, allowing water to flow through the conduit 18 into the container 16 and lower portion of the expansion chamber 17. This flow is stopped when the pressure in the container 16 and chamber 17 is equal to that in the pipe 8.

A suitable corrosion-resistant material, such as glass or a glass fiber reinforced plastic, may be used as a lining for the container 16 and suitable synthetic resins or plastics may be molded to form the expansion chamber 17, conduit 18 and interconnecting fittings. The tubular extension 19 may be made from a flexible plastic tube of approximately ⅜ inch outside diameter connected to an end of a conduit 18, having an inside diameter adapted to receive an end of the flexible tube.

The cost of my treatment apparatus is low and its installation cost is also low since only a single opening in any water system pipe is required for the connecting fitting 20.

My invention is not limited in its application to water chlorination and it will be evident that my novel apparatus and principle of operation may be used to advantage for automatically adding other liquids in measured quantities to water or to other liquids.

I claim:

1. For a water system of the type having a pressure tank, a pump for supplying water under pressure to said tank, and control means for energizing the pump intermittently through a cycle including a pump-energized interval during which a quantity of water is supplied to said tank under rising pressures and a following pump-nonenergized interval during which a predetermined quantity of water is used from said tank under decreasing pressures, improved apparatus for supplying a quantity of treatment liquid to said tank which is proportional to the quantity of water used from said tank during each pump-nonenergized interval comprising, a closed container for treatment liquid, conduit means connecting the upper portion of said container to said water system, and an air-containing expansion chamber communicating with the top of said container and having such capacity as to discharge a volume of liquid into said conduit means which is greater than the capacity of said conduit means by the quanity of treatment liquid required for each pump-nonenergized interval.

2. Apparatus for supplying treatment liquid to a water system in accordance with claim 1 in which the treatment liquid in said container varies in potency at various depths and wherein said conduit means includes a tubular extension having an intake opening disposed at a selected depth in the liquid in said container.

3. Apparatus for supplying treatment liquid to a water system in accordance with claim 1, including an inlet pipe for supplying water under pressure to said tank and wherein said conduit means comprises a branch of said inlet pipe extending to the upper portion of said container.

4. Apparatus for supplying treatment liquid in accordance with claim 3 in which said conduit means include a valve for cutting off flow between said pipe and container and a drain cock interposed between said valve and container.

5. For a water system of the type having a pressure tank, a pump for supplying water under pressure to said tank, an electric motor operatively connected to said pump and control means for energizing said motor intermittently through a cycle including a pump energized interval during which a quantity of water is supplied to said tank under rising pressures, and a pump-nonenergized interval during which a quantity of water is used from said tank under decreasing pressures, improved treatment apparatus comprising; a closed container for treatment liquid, conduit means connecting said container to said water system for flow between the container and system and an air-containing expansion chamber projecting above said container, removably attached thereto, and communicating therewith, the capacity of said chamber being such as to discharge a volume of liquid into said conduit means which is greater than the contents of said conduit means by the quantity of treatment liquid required in said tank during each pump cycle.

6. For a water system of the type having a pressure tank, a pump for supplying water under pressure to said tank, and control means for energizing said pump intermittently through a cycle including a pump energized interval during which a quantity of water is supplied to said tank under rising pressures, and a pump-nonenergized interval during which a quantity of water is used from said tank under decreasing pressures, the improved treatment apparatus which comprises; a closed container for treatment liquid, conduit means connecting said container to said water system for flow between the container and system, and an air-containing expansion chamber projecting above said container and communicating therewith, the capacity of said chamber being such as to discharge a volume of liquid into said conduit means which is greater than the contents of said conduit means by the quantity of treatment liquid required in said tank during each pump cycle.

7. Apparatus for supplying treatment liquid to a water system in accordance with claim 6 in which the treatment liquid in said container varies in potency at various depths and wherein said conduit means includes a tube having an end opening within said tank, said tube being adjustable to position said end opening at various selected depths in the liquid in said container.

8. Apparatus for applying treatment liquid to a water system in accordance with claim 6 including an inlet pipe for supplying water under pressure to said tank and wherein said conduit means comprises a branch of said inlet pipe extending to said container.

9. Apparatus for supplying treatment liquid in accordance with claim 6 in which said conduit means include valve means for cutting off flow between said tank and container and a drain cock interposed between said valve means and container.

References Cited in the file of this patent

UNITED STATES PATENTS 2,493,870   Hartwick _____ Jan. 10, 1950